United States Patent
Balmakhtar et al.

(10) Patent No.: US 12,231,293 B2
(45) Date of Patent: Feb. 18, 2025

(54) INTERPLANETARY FILE SYSTEM (IPFS) IN INSTANTIATING AND RECORDING VIRTUAL NETWORK FUNCTION (VNF)

(71) Applicant: T-Mobile Innovations LLC, Overland Park, KS (US)

(72) Inventors: Marouane Balmakhtar, Fairfax, VA (US); Galip Murat Karabulut, Vienna, VA (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/300,378

(22) Filed: Apr. 13, 2023

(65) Prior Publication Data

US 2024/0348504 A1   Oct. 17, 2024

(51) Int. Cl.
*H04L 41/0895* (2022.01)
*H04L 41/084* (2022.01)

(52) U.S. Cl.
CPC ........ *H04L 41/0895* (2022.05); *H04L 41/084* (2013.01)

(58) Field of Classification Search
None
See application file for complete search history.

(56) References Cited

U.S. PATENT DOCUMENTS

| 11,456,893 B1 | 9/2022 | Paczkowski et al. |
| 11,615,204 B1 | 3/2023 | Paczkowski et al. |
| 2004/0215963 A1 | 10/2004 | Kaplan |
| 2005/0138110 A1 | 6/2005 | Redlich et al. |
| 2011/0231660 A1 | 9/2011 | Kanungo |
| 2013/0080516 A1 | 3/2013 | Bologh |
| 2020/0008067 A1 | 1/2020 | Filsfils et al. |
| 2021/0218754 A1 | 7/2021 | Zou et al. |
| 2023/0205927 A1 | 6/2023 | Paczkowski et al. |

OTHER PUBLICATIONS

Restriction Requirement dated Mar. 31, 2022, U.S. Appl. No. 16/789,008, filed Feb. 12, 2020.
FAIPP Pre-Interview Communication dated Jun. 14, 2022, U.S. Appl. No. 16/789,008, filed Feb. 12, 2020.
FAIPP Office Action dated Aug. 2, 2022, U.S. Appl. No. 16/789,008, filed Feb. 12, 2020.

(Continued)

*Primary Examiner* — Brian Whipple (57) ABSTRACT

A method of instantiating a virtual network function (VNF) in a core network of a communication service provider. The method comprises receiving a request to execute a VNF by a VNF manager application executing on a computer system, where the request comprises a file name of a file in an interplanetary file system (IPFS) to be used to launch the VNF, parsing the file name by the VNF manager application to identify a plurality of content identities (CIDs) that each identify fragments of content that comprise the VNF, retrieving the plurality of fragments of content by the VNF manager application from a non-transitory memory, and launching the VNF by the VNF manager application by instantiating the fragments of content comprising instructions that implement the VNF on a computer system and configuring the instructions that implement the VNF based on the fragments of content that comprise data.

20 Claims, 9 Drawing Sheets

(56) References Cited

OTHER PUBLICATIONS

Notice of Allowance dated Dec. 2, 2022, U.S. Appl. No. 16/789,008, filed Feb. 12, 2020.
Office Action dated Jan. 25, 2022, U.S. Appl. No. 17/031,748, filed Sep. 24, 2020.
Notice of Allowance dated May 27, 2022, U.S. Appl. No. 17/031,748, filed Sep. 24, 2020.
Paczkowski, Lyle W., et al., "Use of Semantically Segmented Filenames," filed Feb. 21, 2023, U.S. Appl. No. 18/172,298.
Notice of Allowance dated Nov. 18, 2024, U.S. Appl. No. 18/172,298, filed Feb. 21, 2023.

INTERPLANETARY FILE SYSTEM (IPFS) IN INSTANTIATING AND RECORDING VIRTUAL NETWORK FUNCTION (VNF)

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication service provider networks are evolving towards implementing core network functionality not with dedicated, special purpose server computers but instead by virtual network functions (VNFs) that may be instantiated and terminated dynamically on generic computer servers. These VNFs may be thought to provide a given communication service by collaborating between a plurality of VNFs which each provides a limited service in the end-to-end communication chain. VNFs may provide application programming interfaces (APIs) that other VNFs can utilize. VNFs may register their APIs and the services they provide in a central register so other VNFs may look them up and use their APIs to access their particular services. As a new evolution of this VNF approach to provide communication services, containerized network functions (CNFs) are new approach that follows in the footsteps of VNFs but within a container that provides a variety of advantages over VNFs. A CNF does not, unlike a VNF, need to be placed on a virtual machine that provides an operating system for use by the VNF. A container can be leaner and more efficient than a virtual machine. A container can be booted faster than a virtual machine and/or a VNF.

SUMMARY

In an embodiment, a method of instantiating a virtual network function (VNF) in a core network of a communication service provider is disclosed. The method comprises receiving a request to execute a VNF by a VNF manager application executing on a computer system, where the request comprises a file name of a file in an interplanetary file system (IPFS) to be used to launch the VNF and parsing the file name by the VNF manager application to identify a plurality of content identities (CIDs), where some of the CIDs identify fragments of content comprising instructions that implement the VNF and some of the CIDs identify fragments of content comprising data that configure the VNF for execution. The method further comprises retrieving the plurality of fragments of content by the VNF manager application from a non-transitory memory and launching the VNF by the VNF manager application by instantiating the fragments of content comprising instructions that implement the VNF on a computer system and configuring the instructions that implement the VNF based on the fragments of content that comprise data.

In another embodiment, a method of instantiating and recording changes in a virtual network function (VNF) in a core network of a communication service provider is disclosed. The method comprises retrieving a plurality of fragments of content by a VNF manager application executing on a computer system from an interplanetary file system (IPFS) stored in a non-transitory memory based on a plurality of content identifiers (CIDs), wherein the plurality of fragments of content define instructions and configuration parameters associated with the VNF and instantiating the VNF by the VNF manager application on a computer system in the core network of the communication service provider. The method further comprises adapting the operation of the VNF by dynamically changing at least some of the configuration parameters associated with the VNF during execution of the VNF and storing the configuration parameters that are changed by the VNF manager application in the IPFS as a new block added to a hyperledger data structure that is one of the plurality of fragments of content, wherein the hyperledger data structure comprises an initial block comprising the plurality of CIDs, a nonce, and a hash over the initial block and wherein every other block in the hyperledger data structure comprises a hash of the preceding block, a nonce, a data content of the block, and a hash over the block.

In yet another embodiment, a method of launching a virtual network function (VNF) in a core network of a communication service provider is disclosed. The method comprises instantiating the VNF on a first computer system in the core network by a VNF manager application executing on a second computer system in the core network based on a plurality of fragments of content that define the VNF and that are retrieved from an interplanetary file system (IPFS) data store based on parsing a name of an IPFS file into a plurality of content identities (CIDs), wherein the plurality of fragments of content comprise executable instructions and comprise data that configure the executable instructions, wherein the data comprises radio access network (RAN) resource parameters, transport resource parameters, core network resource parameters, and network management resource parameters, changing the data that configures the VNF during execution of the VNF, and storing the changed data by the VNF manager application in the IPFS data store associated with the VNF. The method further comprises terminating the VNF on the first computer system, after terminating the VNF on the first computer system, selecting the VNF for execution, and instantiating the VNF on a third computer system in the core network by the VNF manager application based on the plurality of fragments of content defining the VNF, wherein the plurality of fragments of content defining the VNF comprise the changed data, whereby a VNF is quickly restarted and executed based on an evolved previous execution of the VNF.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Improved methods of launching and/or instantiating virtual network functions (VNFs) and containerized network functions (CNFs) are taught by the present disclosure. CNFs may be considered to be an evolution of VNFs and provide advantages over conventional VNFs in some use contexts. This disclosure will use the term VNF throughout, but it is understood the teachings apply equally to the CNF evolution of VNFs as well. As taught herein a VNF may be stored in an interplanetary file system (IPFS) where a name designating a given VNF is a hash of a plurality of content identities (CIDs) of fragments of content that collectively constitute the VNF. The fragments of content may comprise fragments of content that are executable instructions (e.g., computer code and/or binary instructions). The fragments of content may comprise fragments of content that are data for use in configuring an execution environment of the executable instructions and/or in configuring the executable instructions. One of the fragments of content may provide information that indicates how to assemble or concatenate the executable instructions to launch the VNF.

A VNF manager application may execute on a computer system and controls parsing the name of the VNF to identify and retrieve the constituent fragments of content associated with the VNF from the IPFS. The VNF manager application can launch the VNF on an appropriate execution platform in a core network operated by a communication service provider. The VNF manager can monitor the adaptations of the VNF that may be made over time as the VNF participates in the core network to carry traffic and provide communication service. The VNF manager can record these adaptations in a data store such that the VNF manager is able to re-instantiate the VNF in the future in the same configuration in which it last executed, based on the most recent adaptations. This way of structuring VNFs, launching them by the VNF manager application, and tracking the adaptations of the VNFs over time provides efficiencies in operating a core network and providing communication service to users by a service provider.

In an embodiment, the method of launching VNFs stored in an IPFS by a VNF manager application that tracks and records adaptations of VNFs may be especially advantageous for providing virtual network slices (e.g., a virtual network slice is a particular kind of VNF). The core network may be setting up and taking down virtual network slices more frequently than it sets up and takes down other kinds of VNFs. The data content that may be stored in fragments to define the virtual network slice may comprise (1) parameters related to configuring radio access network (RAN) resources, (2) parameters related to configuring transport layer resources, (3) parameters related to configuring network core resources, and (4) parameters related to configuring management resources associated with the virtual network slice. As a virtual network slice is used by an end user—for example a wireless communication subscriber or an enterprise organization—the virtual network slice may be adapted by changing the configuration parameters for any of the RAN, transport, core, and the management resources. The VNF manager application can track these changed parameters and store them in such a way that when the name of the VNF (here a virtual network slice) is used to instantiate the virtual network slice again in the future, this can be done quickly, easily, and back to the last used configuration of the same virtual network slice.

Figure 1:
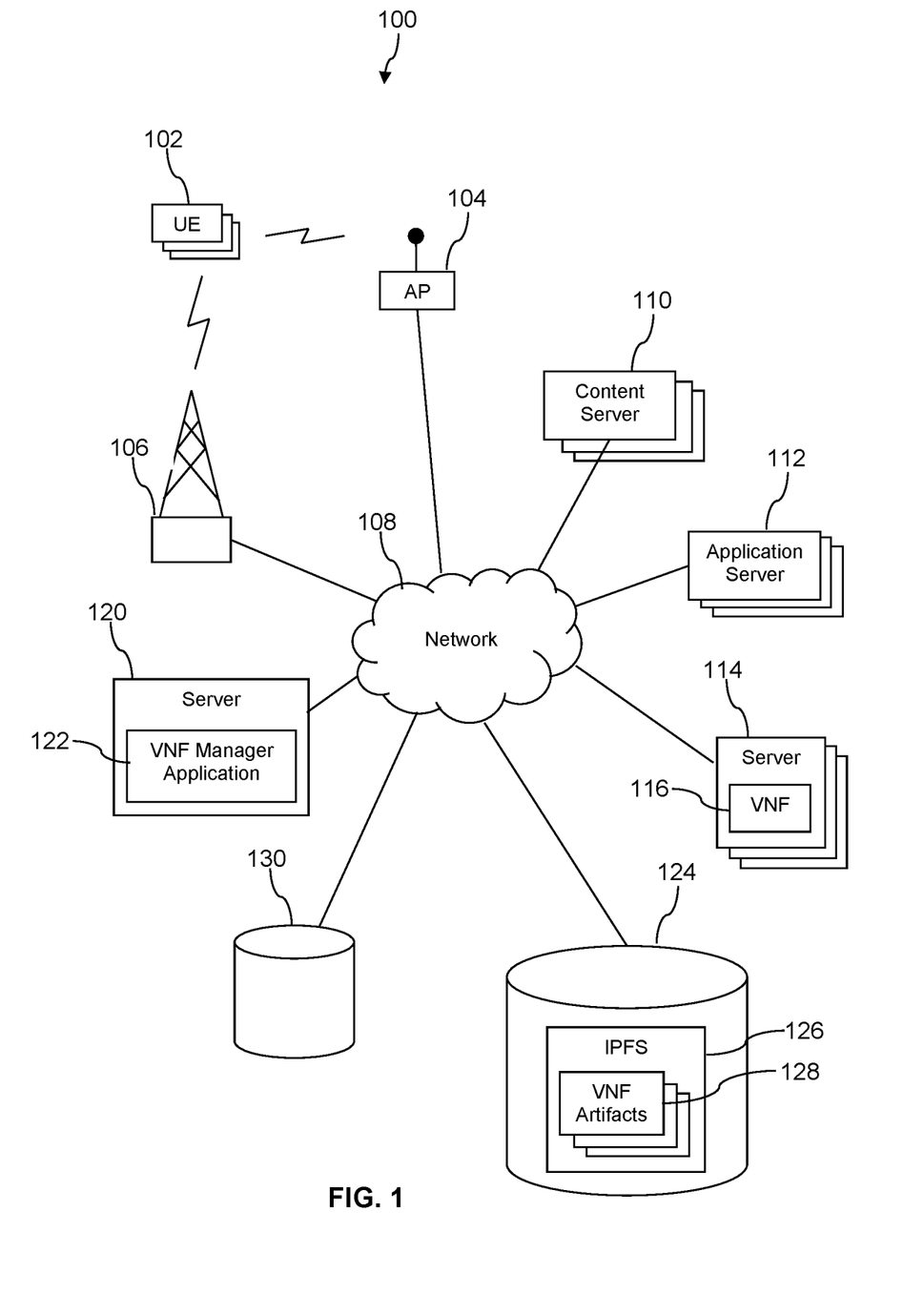
FIG. 1 is a block diagram of a system according to an embodiment of the disclosure.

Turning now to FIG. 1, a communication system 100 is described. In an embodiment, the system 100 comprises a plurality of wireless communication devices 102 or user equipments (UEs) that receive wireless communication links from an access point (AP) 104 or from a cell site 106 and are communicatively coupled therethrough to a network 108. It is understood that the system 100 comprises any number of wireless communication devices 102 (which may be referred to as "devices 102" in some contexts in the interest of concision), any number of APs 104, and any number of cell sites 106. In an embodiment, an AP 104 may provide a WiFi wireless communication link to the device 102. An AP 104 may provide a wireless communication link to the device 102 according to a different short-range wireless communication protocol. In an embodiment, the cell site 106 may provide a wireless communication link to the device 102 according to a 5G, a long-term evolution (LTE), a code division multiple access (CDMA), or a global system for mobile communication (GSM) telecommunication protocol. The network 108 comprises one or more public networks, one or more private networks, or a combination thereof. In an embodiment, the wireless communication device 102 may be a mobile phone, a smart phone, a personal digital assistant (PDA), a wearable computer, a headset computer, a desktop computer, a laptop computer, a notebook computer, a tablet computer, or an Internet of things (IoT) device. Different wireless communication devices 102 in the system 100 may be different types of devices.

The system 100 further comprises one or more content servers 110 and one or more application servers 112. The wireless communication device 102 may be communicatively coupled to one or more content servers 110 to download content such as web site content, streamed video content, or other content. The wireless communication device 102 may be communicatively coupled to one or more application servers 112 to receive services provided by the application servers 112. One of the application servers 112 may provide a gaming application service, a banking application service, a healthcare application service, an electronic commerce service, or other application service. A wireless communication device 102 may have a client application or a mobile application installed locally that requests services from one or more of the application servers 112.

To provide communication service to one or more of the wireless communication devices 102, a wireless communication service provider may desirably launch a virtual network function (VNF) to provide at least some of the communication service. As taught herein, the system 100 may comprise a VNF manager application 122 executing on a server computer 120 that determines when a VNF is to be launched to support the communication service needs of one or more of the devices 102. The VNF manager application 122 may use an interplanetary file system (IPFS) filename to identify a given VNF. This IPFS filename may be a long name that is an aggregation of hashed values which identify VNF artifacts 128 in an IPFS 126 stored in a data store 124, where these VNF artifacts 128 collectively form a VNF 116 that executes on a server computer 114. At least some of the hashed value components of the IPFS filename are content identifiers (CID) of the VNF artifacts 128. In an embodiment, the VNF 116 may be a network slice.

When the VNF manager application 122 receives a request to execute a given VNF 116, the VNF manager application 122 identifies an IPFS filename associated with the given VNF. The VNF manager application 122 may receive a request to execute a VNF from other elements or VNFs in the network 108 in response to communication activities of the UE 102. The VNF manager application 122 parses through the IPFS filename extracting the CIDs of the individual VNF artifacts 128 that collectively make up the given VNF when it is executed, for example when the VNF 116 is executed on the server computer 114. The VNF manager application 122 performs a reverse hash function on the hashed value components of the IPFS filename to extract the cleartext name and location of the VNF artifacts 128 which may be distributed in location. The VNF manager application 122 then retrieves the plurality of VNF artifacts 128 from the IPFS 126 in the data store 124. The VNF manager application 122 then launches the subject VNF 116 on the server computer 114. Part of this last step may involve configuring the instructions that implement the VNF 116 based on some of the VNF artifacts 128 retrieved from the IPFS 126. In some contexts, the VNF artifacts 128 may be referred to as fragments of content or simply fragments. It will be appreciated that the server computer 114 and VNF 116 may be considered to part of the network 108 but are illustrated separately in FIG. 1 to help in describing this specific behavior.

Figure 2:
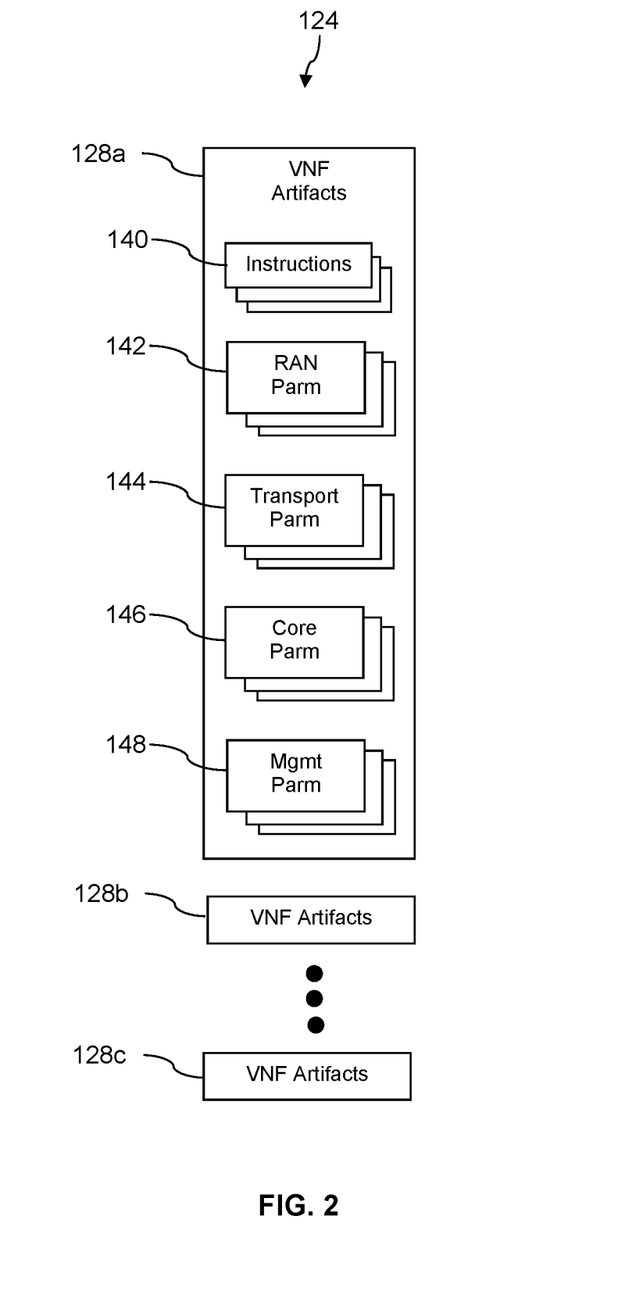
FIG. 2 is a block diagram of content of a data store according to an embodiment of the disclosure.

Turning now to FIG. 2, further details of the VNF artifacts 128 stored in the IPFS 126 are described. A first set of VNF artifacts 128a may be associated with the VNF 116, a second set of VNF artifacts 128b may be associated with the VNF 116, and a third set of VNF artifacts 128c may be associated with a VNF 116. It is understood that any number of sets of artifacts 128 may be associated with a given VNF 116 and different numbers of sets of artifacts 128 may be associated with different VNFs 116. Each set of artifacts 128 may comprise instructions 140 and one or more network resource parameters. The network resource parameters may comprise one or more radio access (RAN) parameters 142, one or more transport parameters 144, one or more core parameters 146, and/or one or more management parameters 148.

In an embodiment, as the UE 102 conducts communication via the network 108 based at least in part on the VNF 116 that is instantiated and executing on server computer 114, one or more operational parameters of the VNF 116 may be changed. For example, some of the changed parameters may be size limits associated with network resources used to implement the VNF 116. For example, the size limits may pertain to size limits on RAN resources allocated to support the VNF 116, transport resources allocated to support the VNF 116, core resources allocated to support the VNF 116, and management resources allocated to support the VNF 116.

Changes are stored in a data store 130 and linked to one or more of the VNF artifacts 128 that make up the instantiated VNF 116. When the VNF manager application 122 parses the CIDs in the IPFS filename of the subject VNF 116 and accesses the VNF artifacts 128 to instantiate an instance of the VNF 116, it may be directed, by the CIDs, to access the data store 130 to retrieve the changed parameters of the VNF 116 that had been stored. In this way, the VNF manager application 122 can conveniently and correctly duplicate additional instances of the VNF 116, for example for different UEs 102 or for the same UE 102 at a later time.

Additionally, if the data store 130 employs secure storage techniques, the system 100 can support attestation that the VNF 116 instantiated is a true duplicate of the prior instantiation of the VNF 116. In an embodiment, the data store 130 may use a ledger of blocks arranged in an immutable data structure to assure that the stored parameters are not altered and to support attestation of sameness. The blocks may comprise an initial block that comprises biographical information related to the VNF 116 stored in a data content portion, a nonce value, and a hash value determined over the data content portion and the nonce value. Later blocks linked in sequence to this initial block may comprise the hash value of the previous block, a data content portion including operational parameters of the associated VNF 116 that have been updated at some point, a nonce value, and a hash over the previous block hash, over the data content, and over the nonce. The nonce may be selected such that the hash of the current block satisfies some criteria, such as having the first four characters of the hash be zero values. In an embodiment, the data store 130 may use a blockchain to store the changed parameters of the associated VNF 116.

Figure 3:
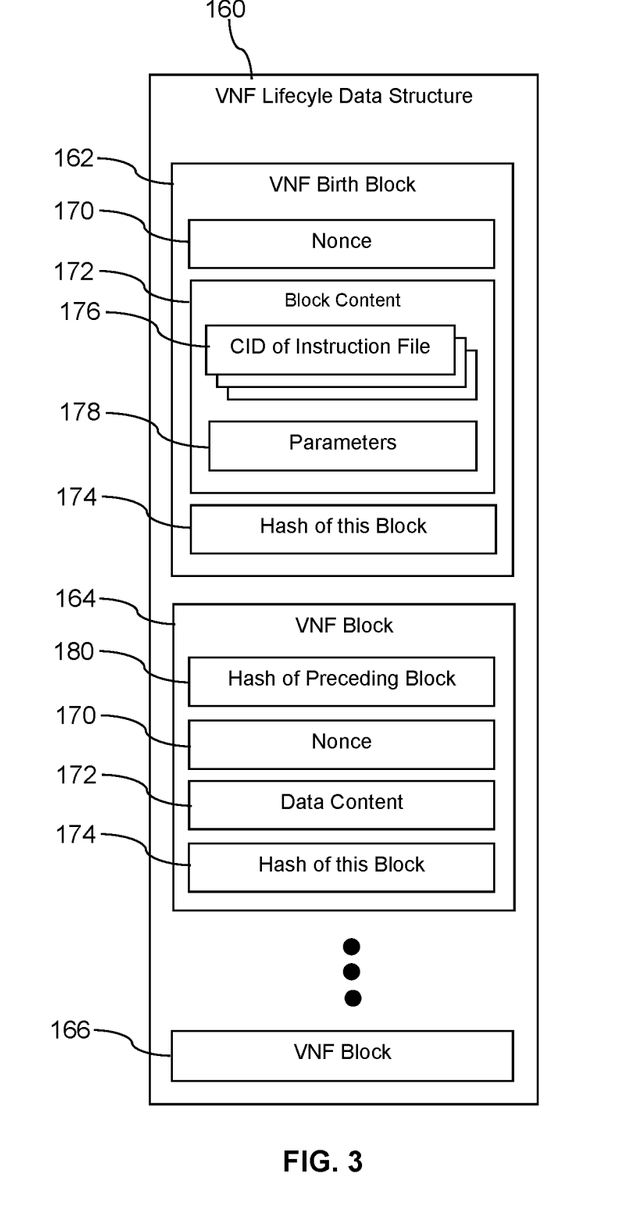
FIG. 3 is a block diagram of a virtual network function (VNF) lifecycle data structure according to an embodiment of the disclosure.

Turning now to FIG. 3, an illustration of a VNF lifecycle data structure 160 is described. In an embodiment, a given instance of the VNF 116 may be associated with its one VNF lifecycle data structure 160 that is used by the VNF manager application 122 or another application to track and record changes of the VNF 116 after it is instantiated. A VNF birth block 162 comprises a nonce 170, clock content 172, and a hash of the birth block 174. In an embodiment, the block content 172 may comprise CIDs of instruction files 176. In another embodiment, however, the block content 172 of the birth block 162 does not contain CIDs of instruction files 176, because these are derivable from the IPFS filename by parsing. The block content 172 may comprise values of parameters 178 of the VNF 116, for example RAN parameters 142, transport parameters 144, core parameters 146, and/or management parameters 148. Additional VNF blocks 164, 166 may comprise a hash of the preceding block 180, a nonce 170, a data content 172 similar to the data content of the VNF birth block 162, and a hash over the subject block 174. New VNF blocks 164, 166 are added to the VNF lifecycle data structure 160 as parameters of the VNF 116 are dynamically adapted over time during the life of the instantiated VNF 116. In an embodiment, the last block of the VNF lifecycle data structure 160 comprises all the current values of parameters, whereby a new instance of the subject VNF 116 can be easily instantiated by reading the VNF birth block 162 and the last block of the VNF lifecycle data structure 160. For example, a new instance of the subject VNF 116 can be instantiated using data parameters (e.g., RAN parameters 142, transport parameters 144, core parameters 146, and/or management parameters 148) by reading data parameters 178 stored in the last VNF block 166 in the VNF life cycle data structure 160. In an embodiment, the VNF lifecycle data structure 160 comprises a pointer or handle for accessing the VNF birth block 162 and a pointer or handle for accessing the last block of the VNF lifecycle data structure 160.

Figure 4:
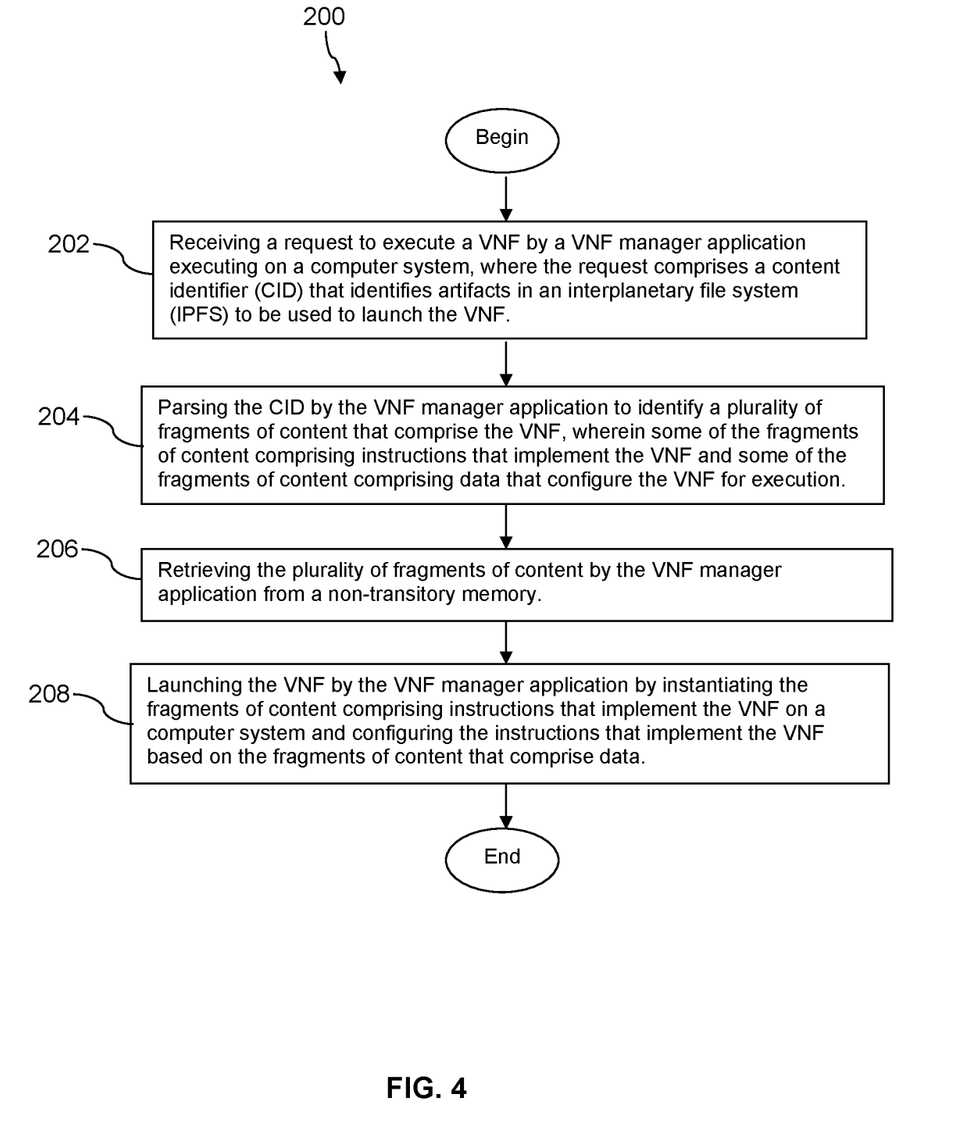
FIG. 4 is a flow chart of a method according to an embodiment of the disclosure.

Turning now to FIG. 4, a method 200 is described. In an embodiment, the method 200 is a method of instantiating a virtual network function (VNF) in a core network of a communication service provider. At block 202, the method 200 comprises receiving a request to execute a VNF by a VNF manager application executing on a computer system, where the request comprises a file name of a file in an interplanetary file system (IPFS) to be used to launch the VNF.

At block 204, the method 200 comprises parsing the file name by the VNF manager application to identify a plurality of content identities (CIDs), where some of the CIDs identify fragments of content comprising instructions that implement the VNF and some of the CIDs identify fragments of content comprising data that configure the VNF for execution. In an embodiment, the fragments of content comprising data comprise radio access network (RAN) parameters. In an embodiment, the fragments of content comprising data comprise transport parameters. In an embodiment, the fragments of content comprising data comprise core parameters. In an embodiment, the fragments of content comprising data comprise management parameters. In an embodiment, the fragments of content comprising data comprise values of network resource limits.

At block 206, the method 200 comprises retrieving the plurality of fragments of content by the VNF manager application from a non-transitory memory. At block 208, the method 200 comprises launching the VNF by the VNF manager application by instantiating the fragments of content comprising instructions that implement the VNF on a computer system and configuring the instructions that implement the VNF based on the fragments of content that comprise data. In an embodiment, the VNF is a virtual network slice.

In an embodiment, the VNF provides communication service for at least one wireless communication device wirelessly coupled to a radio access network (RAN) that is communicatively coupled to the core network of the communication service provider, wherein the at least one wireless communication device is one of a mobile phone, a smart phone, a personal digital assistant (PDA), a wearable computer, a headset computer, a desktop computer, a laptop computer, a notebook computer, a tablet computer, or an Internet of things (IoT) device. The VNF may provide communication service for a plurality of wireless communication devices concurrently, and these wireless communication devices may be different kinds of devices (e.g., selected from mobile phones, smart phones, PDAs, wearable computers, headset computers, desktop computers, laptop computers, notebook computers, tablet computers, and/or IoT devices).

Figure 5:
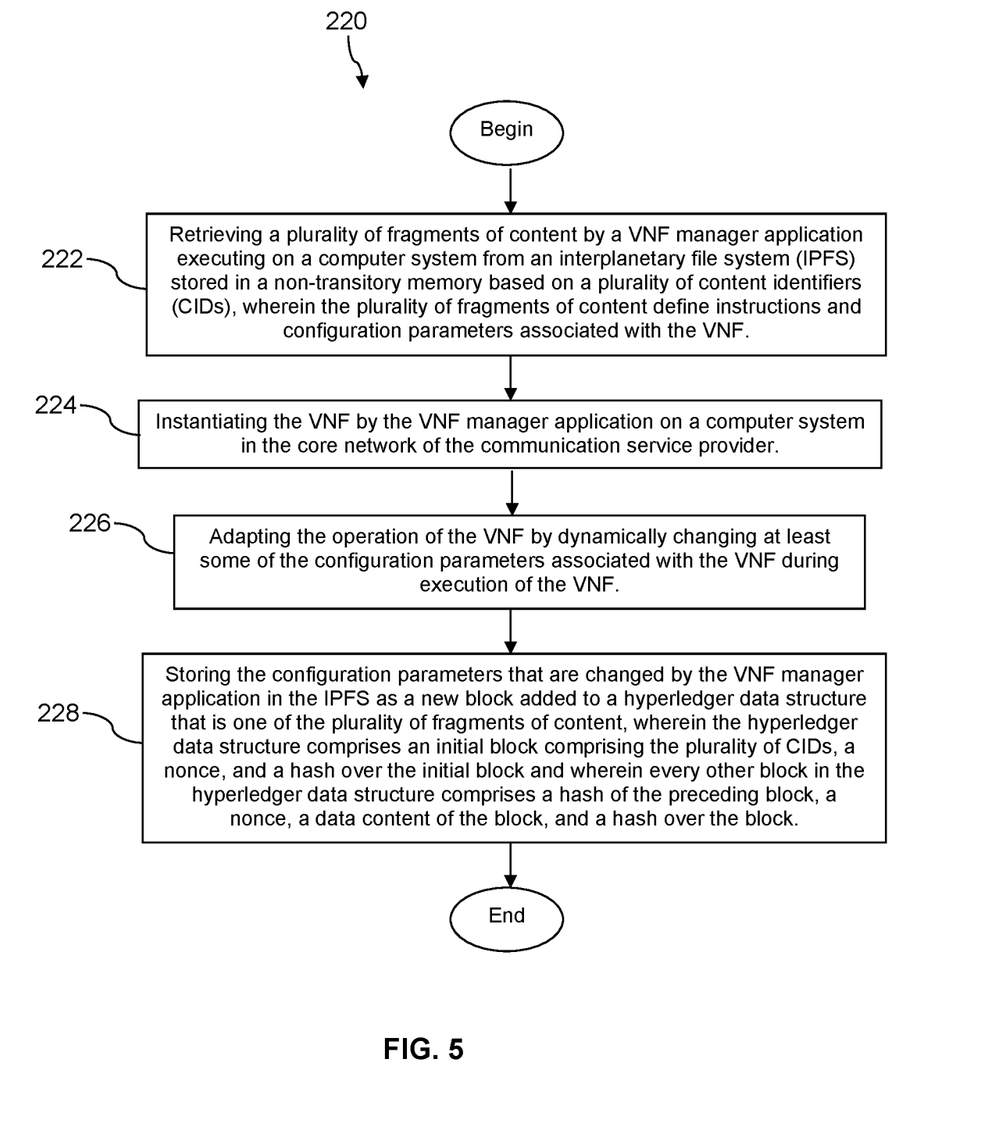
FIG. 5 is a flow chart of another method according to an embodiment of the disclosure.

Turning now to FIG. 5, a method 220 is described. In an embodiment, the method 220 is a method of instantiating and recording changes in a virtual network function (VNF) in a core network of a communication service provider. At block 222, the method 220 comprises retrieving a plurality of fragments of content by a VNF manager application executing on a computer system from an interplanetary file system (IPFS) stored in a non-transitory memory based on a plurality of content identifiers (CIDs), wherein the plurality of fragments of content define instructions and configuration parameters associated with the VNF. In an embodiment, the method 220 further comprises deriving the CIDs by the VNF manager application from an IPFS file name that comprises hashes of the CIDs, for example, before the processing of block 222.

At block 224, the method 220 comprises instantiating the VNF by the VNF manager application on a computer system in the core network of the communication service provider. In an embodiment, the VNF is instantiated to support communication activities of a wireless communication device, wherein the wireless communication device is one of a smart phone, a wearable computer, a headset computer, a desktop computer, a laptop computer, a tablet computer, or a notebook computer. In an embodiment, the VNF is instantiated to support communication activities of a plurality of wireless communication devices, wherein the plurality of wireless communication devices are a plurality of Internet of things (IoT) devices.

At block 226, the method 220 comprises adapting the operation of the VNF by dynamically changing at least some of the configuration parameters associated with the VNF during execution of the VNF. In an embodiment, the configuration parameters comprise size limits associated with network resources used to execute the VNF. In an embodiment, the size limits comprise size limits on radio access network (RAN) resources and limits on transport resources. In an embodiment, the size limits comprise size limits on core resources and on management resources.

At block 228, the method 220 comprises storing the configuration parameters that are changed by the VNF manager application in the IPFS as a new block added to a hyperledger data structure that is one of the plurality of fragments of content, wherein the hyperledger data structure comprises an initial block comprising the plurality of CIDs, a nonce, and a hash over the initial block and wherein every other block in the hyperledger data structure comprises a hash of the preceding block, a nonce, a data content of the block, and a hash over the block.

In an embodiment, the VNF provides communication service for at least one wireless communication device wirelessly coupled to a radio access network (RAN) that is communicatively coupled to the core network of the communication service provider, wherein the at least one wireless communication device is one of a mobile phone, a smart phone, a personal digital assistant (PDA), a wearable computer, a headset computer, a desktop computer, a laptop computer, a notebook computer, a tablet computer, or an Internet of things (IoT) device. The VNF may provide communication service for a plurality of wireless communication devices concurrently, and these wireless communication devices may be different kinds of devices (e.g., selected from mobile phones, smart phones, PDAs, wearable computers, headset computers, desktop computers, laptop computers, notebook computers, tablet computers, and/or IoT devices).

Figure 6:
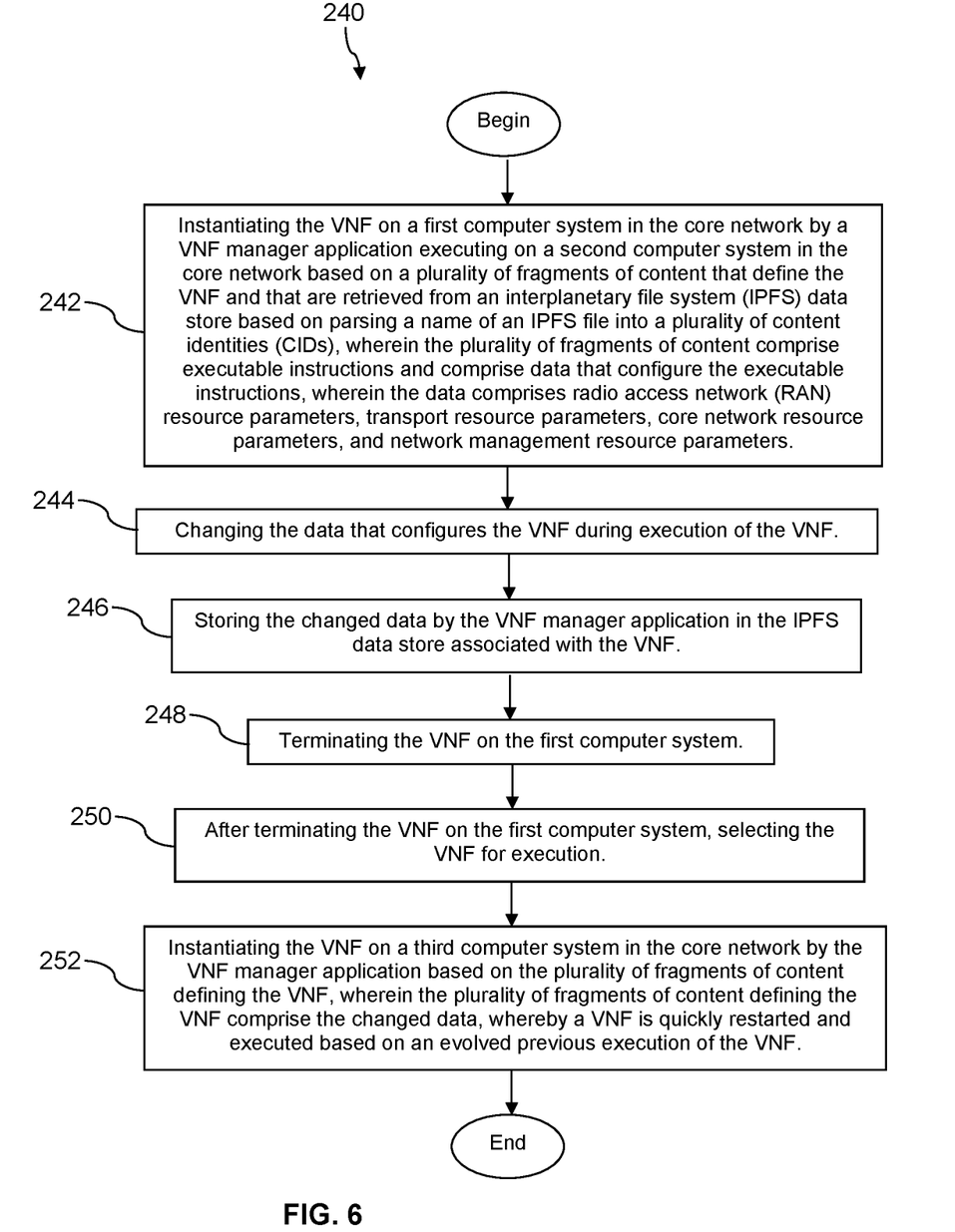
FIG. 6 is a flow chart of yet another method according to an embodiment of the disclosure.

Turning now to FIG. 6, a method 240 is described. In an embodiment, the method 240 is a method of launching a virtual network function (VNF) in a core network of a communication service provider. At block 242, the method 240 comprises instantiating the VNF on a first computer system in the core network by a VNF manager application executing on a second computer system in the core network based on a plurality of fragments of content that define the VNF and that are retrieved from an interplanetary file system (IPFS) data store based on parsing of an IPFS file name into a plurality of content identities (CIDs), wherein the plurality of fragments of content comprise executable instructions and comprise data that configure the executable instructions, wherein the data comprises radio access network (RAN) resource parameters, transport resource parameters, core network resource parameters, and network management resource parameters.

At block 244, the method 240 comprises changing the data that configures the VNF during execution of the VNF. In an embodiment, changing the data that configures the VNF comprises changing at least one radio access network (RAN) resource limit. In an embodiment, changing the data that configures the VNF comprises changing at least one transport resource limit. In an embodiment, changing the data that configures the VNF comprises changing at least one core network resource limit. In an embodiment, changing the data that configures the VNF comprises changing at least one management resource limit.

At block 246, the method 240 comprises storing the changed data by the VNF manager application in the IPFS data store associated with the VNF.

At block 248, the method 240 comprises terminating the VNF on the first computer system. At block 250, the method 240 comprises, after terminating the VNF on the first computer system, selecting the VNF for execution. At block 252, the method 240 comprises instantiating the VNF on a third computer system in the core network by the VNF manager application based on the plurality of fragments of content defining the VNF, wherein the plurality of fragments of content defining the VNF comprise the changed data, whereby a VNF is quickly restarted and executed based on an evolved previous execution of the VNF.

In an embodiment, the VNF provides communication service for at least one wireless communication device wirelessly coupled to a radio access network (RAN) that is communicatively coupled to the core network of the communication service provider, wherein the at least one wireless communication device is one of a mobile phone, a smart phone, a personal digital assistant (PDA), a wearable computer, a headset computer, a desktop computer, a laptop computer, a notebook computer, a tablet computer, or an Internet of things (IoT) device. The VNF may provide communication service for a plurality of wireless communication devices concurrently, and these wireless communication devices may be different kinds of devices (e.g., selected from mobile phones, smart phones, PDAs, wearable computers, headset computers, desktop computers, laptop computers, notebook computers, tablet computers, and/or IoT devices).

Figure 7A:
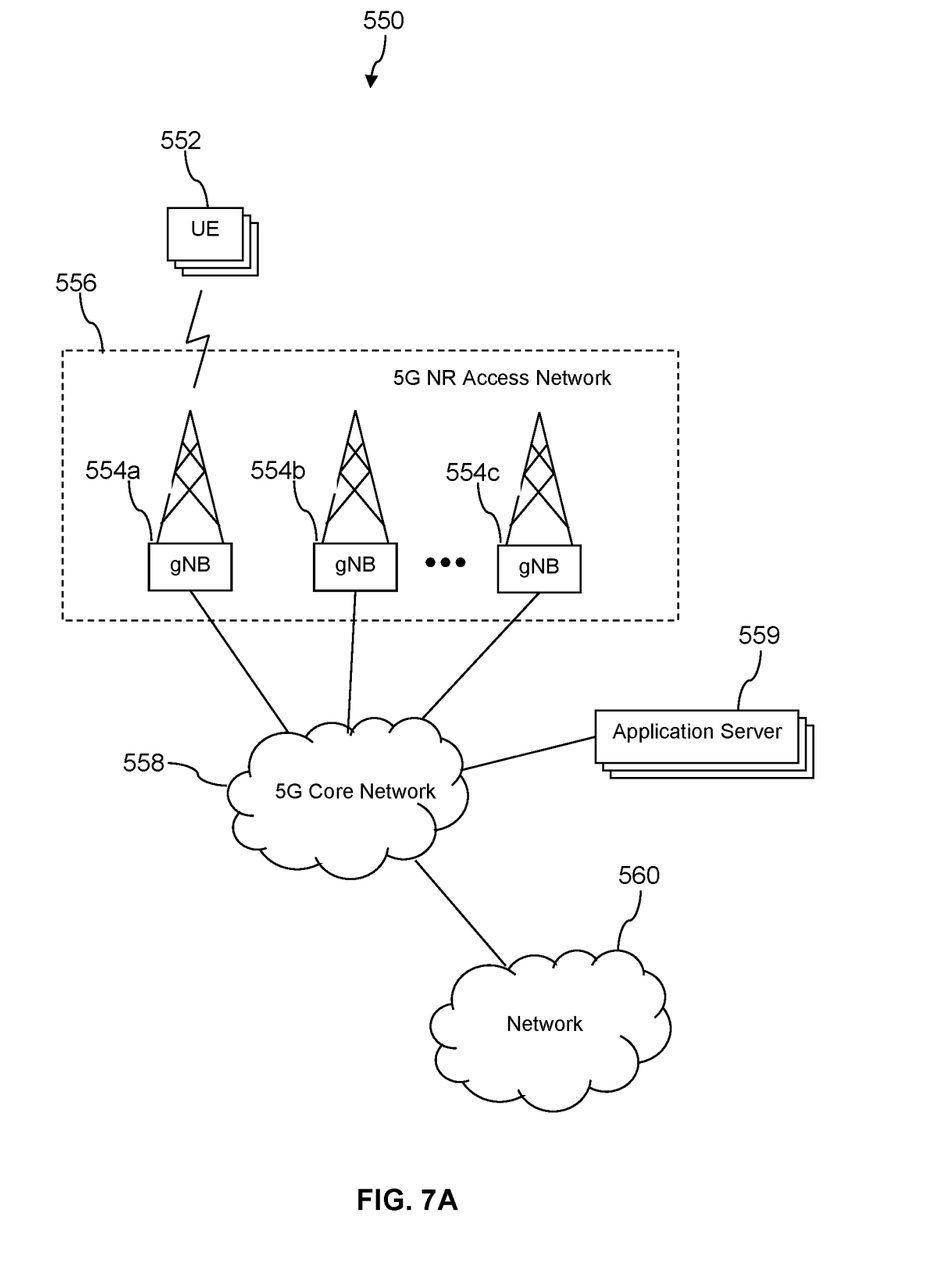
FIG. 7A is a block diagram of a communication network according to an embodiment of the disclosure.

Turning now to FIG. 7A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
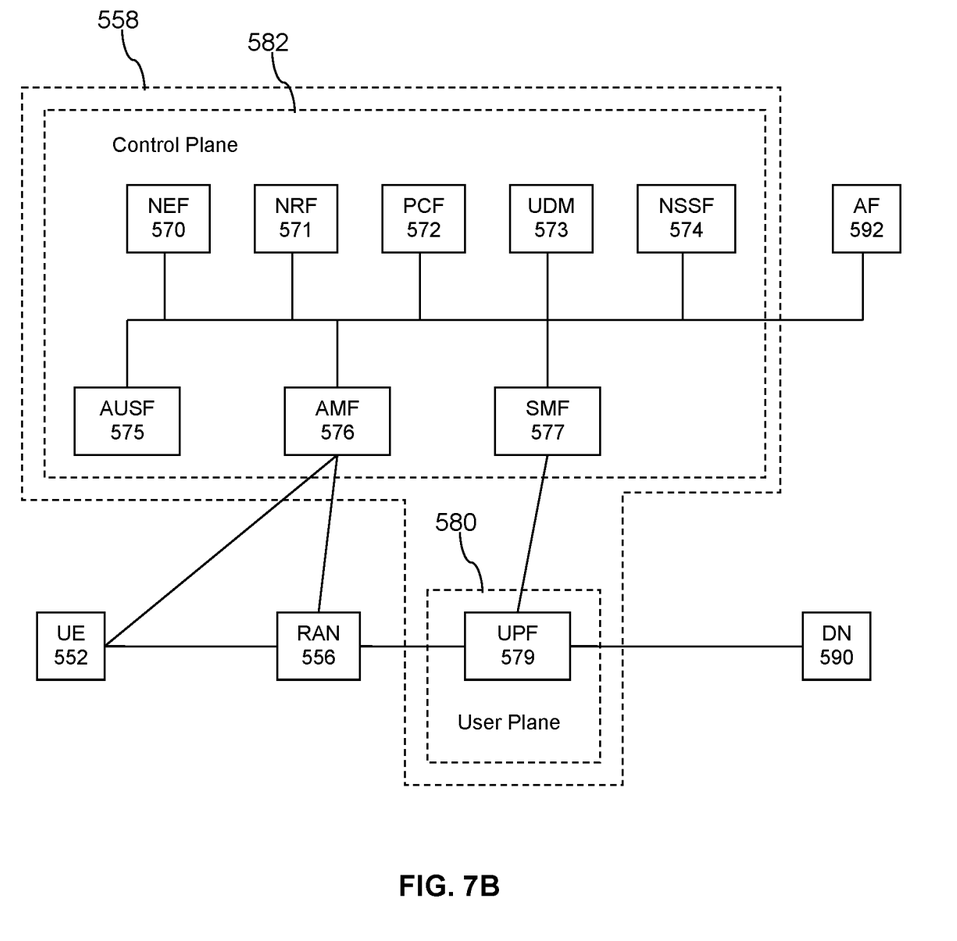
FIG. 7B is a block diagram of a core network according to an embodiment of the disclosure.

Turning now to FIG. 7B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 7A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 8:
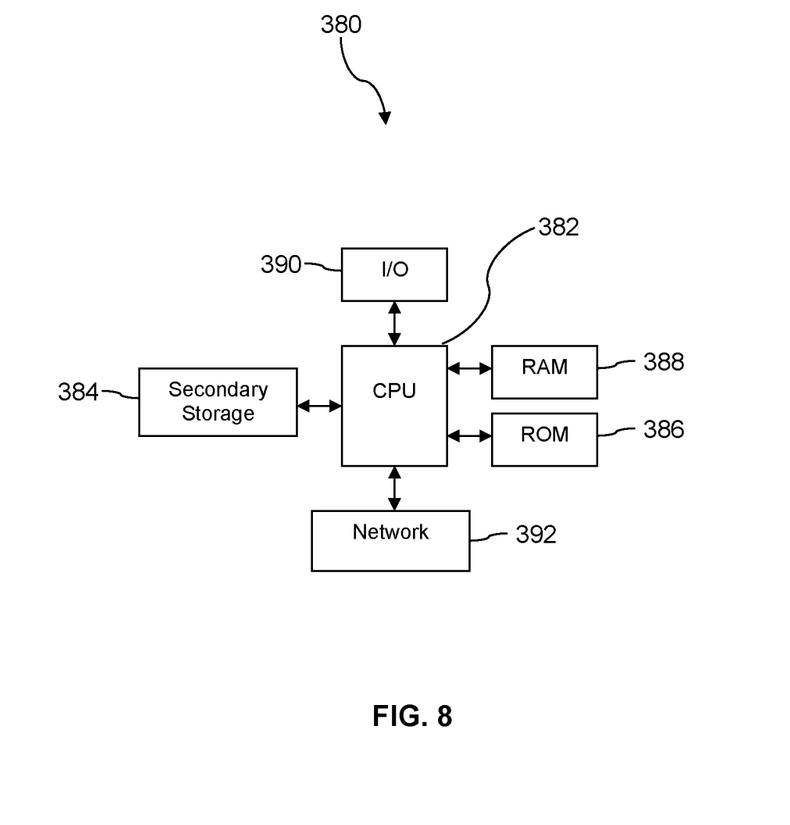
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of launching a virtual network function (VNF) in a core network of a communication service provider, comprising:

instantiating the VNF on a first computer system in the core network by a VNF manager application executing on a second computer system in the core network based on a plurality of fragments of content that define the VNF and that are retrieved from an interplanetary file system (IPFS) data store based on parsing a name of an IPFS file into a plurality of content identities (CIDs), wherein the plurality of fragments of content comprise executable instructions and comprise data that configure the executable instructions, wherein the data comprises radio access network (RAN) resource parameters, transport resource parameters, core network resource parameters, and network management resource parameters;

changing the data that configures the VNF during execution of the VNF;

storing the changed data by the VNF manager application in the IPFS data store associated with the VNF;

terminating the VNF on the first computer system;

after terminating the VNF on the first computer system, selecting the VNF for execution; and instantiating the VNF on a third computer system in the core network by the VNF manager application based on the plurality of fragments of content defining the VNF, wherein the plurality of fragments of content defining the VNF comprise the changed data, whereby the VNF is restarted and executed based on an evolved previous execution of the VNF.

2. The method of claim 1, wherein changing the data that configures the VNF comprises changing at least one radio access network (RAN) resource limit.

3. The method of claim 1, wherein changing the data that configures the VNF comprises changing at least one transport resource limit.

4. The method of claim 1, wherein changing the data that configures the VNF comprises changing at least one core network resource limit.

5. The method of claim 1, wherein changing the data that configures the VNF comprises changing at least one management resource limit.

6. The method of claim 1, wherein the VNF provides communication service for at least one wireless communication device wirelessly coupled to a radio access network (RAN) that is communicatively coupled to the core network of the communication service provider, wherein the at least one wireless communication device is one of a mobile phone, a smart phone, a personal digital assistant (PDA), a wearable computer, a headset computer, a desktop computer, a laptop computer, a notebook computer, a tablet computer, or an Internet of things (IoT) device.

7. The method of claim 1, wherein storing the changed data comprises storing the changed data as a new block added to a hyperledger data structure that is one of the plurality of fragments of content.

8. The method of claim 7, wherein the hyperledger data structure comprises an initial block comprising the plurality of CIDs, a nonce, and a hash over the initial block.

9. The method of claim 8, wherein every other block in the hyperledger data structure comprises a hash of the preceding block, a nonce, a data content of the block, and a hash over the block.

10. The method of claim 7, wherein the VNF is instantiated to support communication activities of a wireless communication device, wherein the wireless communication device is one of a smart phone, a wearable computer, a headset computer, a desktop computer, a laptop computer, a tablet computer, or a notebook computer.

11. The method of claim 7, wherein the VNF is instantiated to support communication activities of a plurality of wireless communication devices, wherein the plurality of wireless communication devices are a plurality of Internet of things (IoT) devices.

12. The method of claim 7, further comprising deriving the plurality of CIDs by the VNF manager application from an IPFS file name that comprises hashes of the plurality of CIDs.

13. The method of claim 7, wherein the changed data comprises size limits associated with network resources used to execute the VNF.

14. The method of claim 13, wherein the size limits comprise size limits on radio access network (RAN) resources and limits on transport resources.

15. The method of claim 13, wherein the size limits comprise size limits on core resources and on management resources.

16. The method of claim 1, further comprising receiving a request to execute the VNF by the VNF manager application, where the request comprises the name of the IPFS file to be used to launch the VNF.

17. The method of claim 16, wherein the VNF is instantiated in response to the request.

18. The method of claim 1, wherein the VNF is a virtual network slice.

19. The method of claim 1, wherein the changed data is stored in a ledger of blocks.

20. The method of claim 19, wherein an initial block of the ledger comprises biographical information related to the VNF in a data content portion, a nonce value, and a hash value determined over the data content portion and the nonce value.

* * * * *